(12) United States Patent
Tanaka et al.

(10) Patent No.: US 8,825,210 B2
(45) Date of Patent: Sep. 2, 2014

(54) ROBOT AND ROBOT SYSTEM

(75) Inventors: Kentaro Tanaka, Fukuoka (JP); Hisaya Inoue, Fukuoka (JP); Satoshi Sueyoshi, Fukuoka (JP); Kazuhiro Haniya, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 275 days.

(21) Appl. No.: 13/398,849

(22) Filed: Feb. 17, 2012

(65) Prior Publication Data

US 2013/0046409 A1    Feb. 21, 2013

(30) Foreign Application Priority Data

Aug. 19, 2011  (JP) .................................. 2011-179386

(51) Int. Cl.
*G05B 15/00*    (2006.01)
*B25J 9/10*    (2006.01)

(52) U.S. Cl.
CPC ................ *B25J 9/103* (2013.01); *Y10S 901/23* (2013.01); *Y10S 901/25* (2013.01)
USPC ............. 700/258; 700/245; 700/260; 901/23; 901/25

(58) Field of Classification Search
CPC ...................................................... B25J 9/103
USPC ....................... 700/245, 258, 260; 901/23, 25
See application file for complete search history.

(56) References Cited

U.S. PATENT DOCUMENTS

| | | | | |
|---|---|---|---|---|
| 4,608,651 | A | * | 8/1986 | Murakami et al. ............. 700/250 |
| 4,968,239 | A | * | 11/1990 | Inaba et al. .................... 425/150 |
| 5,293,107 | A | * | 3/1994 | Akeel ....................... 318/568.11 |
| 5,669,269 | A | * | 9/1997 | Katamine et al. .......... 74/490.02 |
| 2002/0066331 | A1 | * | 6/2002 | Okada et al. ............... 74/490.03 |
| 2003/0208301 | A1 | * | 11/2003 | Baba et al. .................... 700/245 |
| 2007/0138991 | A1 | * | 6/2007 | Kumagai et al. ......... 318/568.11 |
| 2010/0229670 | A1 | * | 9/2010 | Nogami et al. ............ 74/490.01 |

FOREIGN PATENT DOCUMENTS

| | | |
|---|---|---|
| JP | 58-143210 | 8/1983 |
| JP | 62-150405 | 7/1987 |
| JP | 63-170707 | 11/1988 |
| JP | 06-48373 | 6/1994 |
| JP | 2004-316722 | 11/2004 |
| JP | 2008-307618 | 12/2008 |

OTHER PUBLICATIONS

Japanese Office Action for corresponding JP Application No. 2011-179386, Jul. 23, 2013.
Extended European Search Report for corresponding EP Application No. 12156106.2-1712, May 15, 2013.
Japanese Decision of a Patent Grant for corresponding JP Application No. 2011-179386, Dec. 3, 2013.

* cited by examiner

*Primary Examiner* — Khoi Tran
*Assistant Examiner* — Jorge Peche
(74) *Attorney, Agent, or Firm* — Mori & Ward, LLP

(57) ABSTRACT

A robot according to embodiments includes a speed reducer, a first shaft, a rotary electric machine, a second shaft, and a brake. The speed reducer reduces and outputs rotation to be input into an input unit. The first shaft is connected to the input unit. The rotary electric machine rotates the first shaft. The second shaft is connected to the input unit. The brake regulates the rotation of the second shaft.

8 Claims, 8 Drawing Sheets

ROBOT AND ROBOT SYSTEM

CROSS-REFERENCE TO RELATED APPLICATION

This application is based upon and claims the benefit of priority of the prior Japanese Patent Application No. 2011-179386, filed on Aug. 19, 2011, the entire contents of which are incorporated herein by reference.

FIELD

The embodiments discussed herein are directed to a robot and a robot system.

BACKGROUND

Conventional various robots such as a conveying robot, a welding robot, and a painting robot are used in a production site.

This kind of robot can include a brake, which prevents a component such as an arm from deviating from its normal position by its own weight, in some cases when a power source is blocked, for example. For example, Japanese Laid-open Patent Publication No. 2008-307618 discloses a robot that includes a non-excitation operation type electromagnetic brake of which the braking force is released by an electromagnetic force during power-on and the braking force is activated by a mechanical action of a spring or the like during power-off.

As described above, the conventional technology prevents a component such as an arm from deviating from its position by using a brake. However, the conventional technology has further room for improvement in that a component such as an arm can be more surely prevented from deviating from its position.

For example, one arm can be connected to the other arm via a speed reducer in some cases. In this case, when an input gear provided in an input shaft for inputting the rotation of a motor into the speed reducer is worn away due to aged deterioration, the posture of the arm is held in the state where the position of the arm is deviated by a wearing amount by which the input gear is worn away. For this reason, a posture-related calculation may not be secured of the posture holding position of an arm.

A conventional arm is beforehand prevented from deviating from its position by regularly performing the exchange of an input gear, for example. However, it is preferable to more surely prevent the position deviation of a component such as an arm.

SUMMARY

A robot according to an aspect of embodiments includes a speed reducer, a first shaft, a rotary electric machine, a second shaft, and a brake. The speed reducer reduces and outputs a rotation to be input into an input unit. The first shaft is connected to the input unit. The rotary electric machine rotates the first shaft. The second shaft is connected to the input unit. The brake regulates the rotation of the second shaft.

Moreover, a robot system according to an aspect of embodiments includes a robot and a control device. The robot includes a speed reducer, a first shaft, a rotary electric machine, a second shaft, and a brake. The speed reducer reduces and outputs a rotation to be input into an input unit. The first shaft is connected to the input unit. The rotary electric machine rotates the first shaft. The second shaft is connected to the input unit. The brake regulates the rotation of the second shaft. Moreover, the control device controls the robot.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, a robot and a robot system according to embodiments of the present disclosure will be explained in detail. In addition, the embodiments disclosed below are not intended to limit the present invention.

First Embodiment

Figure 1:
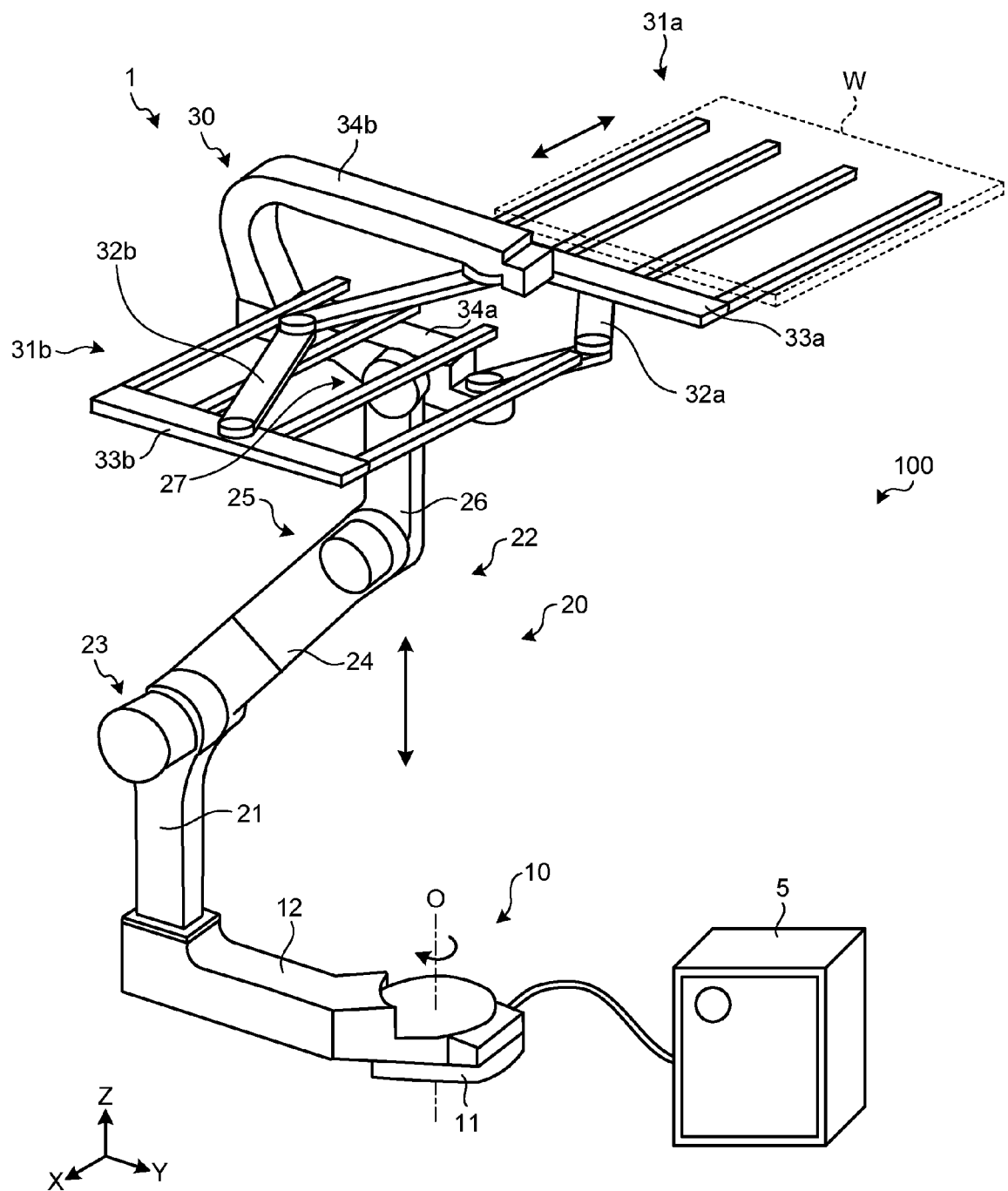
FIG. 1 is a pattern perspective view of a robot according to a first embodiment.

First, the configuration of a robot according to the first embodiment is explained with reference to FIG. 1. FIG. 1 is a pattern perspective view of a robot 1 according to the first embodiment. Hereinafter, for convenience of explanation, a positional relationship between components of the robot 1 will be explained on the assumption that the swiveling position of the robot 1 is in a state illustrated in FIG. 1. Moreover, it is assumed that a Z-axis direction is a vertical direction.

As illustrated in FIG. 1, the robot 1 includes a swiveling mechanism 10, a lifting and lowering mechanism 20, and a horizontal arm unit 30.

The swiveling mechanism 10 includes a base 11 and a swivel base 12. The base 11 is provided on a floor or the like, for example. The swivel base 12 is rotatably attached to the upper portion of the base 11 around a pivot axis O. The swivel base 12 swivels around the pivot axis O that is a vertical axis. The lifting and lowering mechanism 20 and the horizontal arm unit 30 swivel around the pivot axis O in accordance with the swivel of the swivel base 12.

The lifting and lowering mechanism 20 includes a support 21 and a leg unit 22. The support 21 is a member that is provided in a vertical direction from the leading end of the swivel base 12 in a standing manner. The leg unit 22 is a member of which the bottom end is supported on the leading end of the support 21 and the leading end supports the horizontal arm unit 30. The lifting and lowering mechanism 20 changes the posture of the leg unit 22 to move up and down the horizontal arm unit 30 along an axis parallel to the pivot axis O.

The leg unit 22 includes a first lifting arm 24 and a second lifting arm 26. The bottom end of the first lifting arm 24 is connected to the leading end of the support 21 via a first joint 23. As a result, the first lifting arm 24 is rotatably supported on the leading end of the support 21 to rotate around a joint axis of the first joint 23 that is a horizontal axis.

The bottom end of the second lifting arm 26 is connected to the leading end of the first lifting arm 24 via a second joint 25. As a result, the second lifting arm 26 is rotatably supported on the leading end of the first lifting arm 24 to rotate around a joint axis of the second joint 25 that is a horizontal axis.

The horizontal arm unit 30 is connected to the leading end of the second lifting arm 26 via a third joint 27. As a result, the horizontal arm unit 30 is rotatably supported on the leading end of the second lifting arm 26 to rotate around a joint axis of the third joint 27 that is a horizontal axis.

In this way, the robot 1 according to the first embodiment supports the horizontal arm unit 30 by using the one leg unit 22. For this reason, the robot 1 can have the simplified configuration compared to when the robot supports the horizontal arm unit 30 by using two or more lifting arm units.

The horizontal arm unit 30 includes a downside arm unit 31a and an upside arm unit 31b. The downside arm unit 31a includes a hand part 33a, an arm part 32a, and a downside supporting member 34a. The hand part 33a places thereon a thin-plate-shaped workpiece W that is a conveying target. In the arm part 32a, its bottom end is supported on the downside supporting member 34a and its leading end supports the hand part 33a. The downside supporting member 34a is rotatably supported on the leading end of the second lifting arm 26 to rotate around the joint axis of the third joint 27. The bottom end of an upside supporting member 34b is fixed to the downside supporting member 34a and the bottom end of the arm part 32a is rotatably supported on the downside supporting member 34a.

The upside arm unit 31b includes a hand part 33b, an arm part 32b, and the upside supporting member 34b. The hand part 33b places thereon a thin-plate-shaped workpiece W (not illustrated) that is a conveying target. In the arm part 32b, its bottom end is rotatably supported on the upside supporting member 34b and its leading end supports the hand part 33b. The bottom end of the upside supporting member 34b is connected to the bottom end of the downside supporting member 34a in such a manner that the upside supporting member 34b is rotatably supported to rotate around the joint axis of the third joint 27.

The horizontal arm unit 30 moves the hand parts 33a and 33b to a predetermined direction by expanding and contracting the arm parts 32a and 32b. For example, when the robot 1 is located at the swiveling position illustrated in FIG. 1, the robot 1 makes the hand part 33a be located at the position slightly lower than the height of the target workpiece W that is stored in a stocker by lifting or lowering the horizontal arm unit 30 by using the lifting and lowering mechanism 20. Moreover, the stocker stores the workpieces W that are accumulated at constant intervals between a height near a ceiling and a height near a floor of a factory in which the robot 1 is provided, for example.

Next, the robot 1 drives the arm part 32a to linearly move the hand part 33a in a horizontal direction and thus makes the hand part 33a go into the stocker that stores the workpiece W. After that, the robot 1 raises the horizontal arm unit 30 by using the lifting and lowering mechanism 20. As a result, the workpiece W is placed on the hand part 33a.

Next, the robot 1 contracts the arm part 32a to linearly withdraw the hand part 33a on which the workpiece W is placed from the stocker in a horizontal direction. After that, the robot 1 swivels the horizontal arm unit 30 and the lifting and lowering mechanism 20 by using the swiveling mechanism 10 in such a manner that the leading end of the hand part 33a is directed to the conveying position of the workpiece W.

Next, the robot 1 again expands the arm part 32a to linearly move the hand part 33a in a horizontal direction and thus makes the hand part 33a go to the upper side of the conveying position. Then, the robot 1 lets down the horizontal arm unit 30 by using the lifting and lowering mechanism 20. As a result, the position of the hand part 33a goes down and thus the workpiece W is placed at the conveying position.

In this way, the robot 1 transports the workpiece W through the movement of the hand parts 33a and 33b performed by expansion and contraction of the arm parts 32a and 32b, the lifting and lowering of the horizontal arm unit 30 performed by the lifting and lowering mechanism 20, and the swivel of the horizontal arm unit 30 performed by the swiveling mechanism 10.

Such an operation of the robot 1 is performed by an instruction of a control device 5 that is connected to the robot 1 via a communication network. Moreover, a robot system 100 according to the first embodiment includes at least the robot 1 and the control device 5.

The control device 5 controls the driving of the robot 1. More specifically, each of the joints 23, 25, and 27 of the robot 1 is provided with a motor. The control device 5 instructs the motors to perform a driving operation. The robot 1 individually rotates the motors by arbitrary angles in accordance with the instruction of the control device 5 to drive the swiveling mechanism 10, the lifting and lowering mechanism 20, and the horizontal arm unit 30. A general network such as for example a wired LAN (Local Area Network) and a wireless LAN can be used as a communication network for connecting the robot 1 and the control device 5. Moreover, although it is not illustrated herein, similar motors are also provided in the swivel base 12 and the arm parts 32a and 32b and the control device 5 instructs these motors to perform a driving operation. These motors are an example of a rotary electric machine.

Each of the joints 23, 25, and 27 is further provided with a speed reducer and an external brake. The speed reducer is a transfer mechanism that reduces and outputs the rotation of the motor. The external brake is a brake that regulates the rotation of an output shaft of the speed reducer by regulating the rotation of an input shaft of the speed reducer. The output shaft of the speed reducer is connected to arms such as the horizontal arm unit 30, the first lifting arm 24, and the second lifting arm 26. Therefore, the position deviation by the own weight of the arm can be prevented by activating the external brake.

Herein, like the robot 1 according to the first embodiment, there is a possibility that an input gear provided in the input shaft of the speed reducer is worn away due to aged deterioration when one arm is connected to the other arm via the speed reducer. When the input gear is worn away, there is a possibility that the position deviation corresponding to a wearing amount is caused and thus the position for holding the posture of the arm is deviated from a normal position.

Therefore, according to the robot 1 of the first embodiment, a shaft connected to the input shaft of the speed reducer is divided into a motor-side shaft and an external-brake-side shaft and input gears are provided in the respective shafts.

As a result, even if the motor-side input gear is worn or damaged, the robot 1 according to the first embodiment can appropriately transmit the braking force of the external brake to the speed reducer. Therefore, the position deviation of an arm can be surely prevented.

Hereinafter, the configuration of a motor, a speed reducer, and an external brake provided in each of the joints 23, 25, and 27 will be specifically explained.

Figure 2:
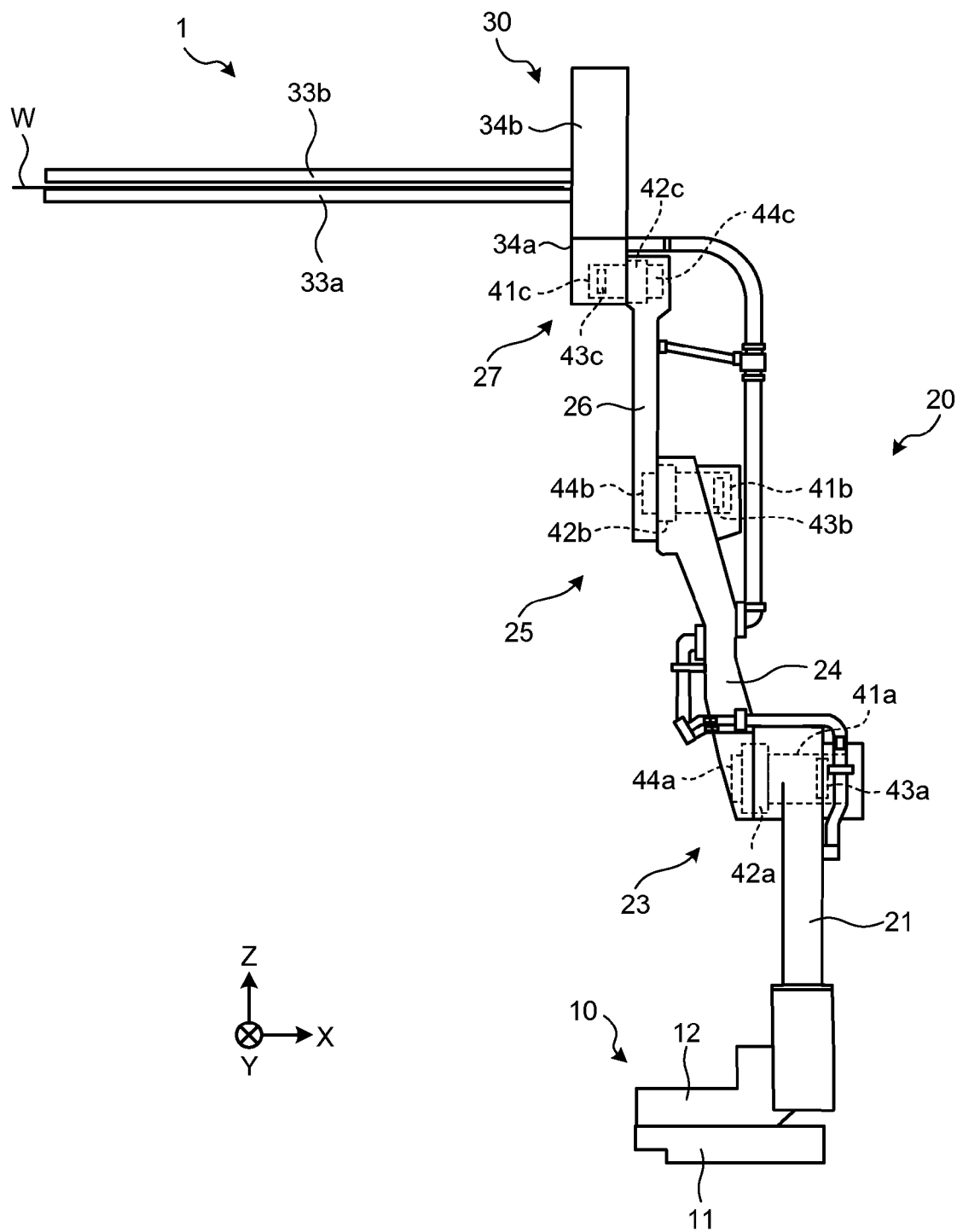
FIG. 2 is a pattern side view of the robot.

FIG. 2 is a pattern side view of the robot 1. As illustrated in FIG. 2, the robot 1 includes the first joint 23, the second joint 25, and the third joint 27. The first joint 23 is a joint that connects the bottom end of the first lifting arm 24 and the leading end of the support 21. The second joint 25 is a joint that connects the bottom end of the second lifting arm 26 and the leading end of the first lifting arm 24. The third joint 27 is a joint that connects the horizontal arm unit 30 and the leading end of the second lifting arm 26.

A motor 41a, a speed reducer 42a, and an external brake 44a are provided in the first joint 23. A motor 41b, a speed reducer 42b, and an external brake 44b are provided in the second joint 25. A motor 41c, a speed reducer 42c, and an external brake 44c are provided in the third joint 27. Moreover, the motors 41a to 41c respectively have internal brakes 43a to 43c built-in. The motors 41a to 41c are an example of a rotary electric machine.

The internal brakes 43a to 43c and external brakes 44a to 44c are, for example, a non-excitation operation type electromagnetic brake. The non-excitation operation type electromagnetic brake is a brake in which braking is released by an electromagnetic force during power-on and braking is performed by a mechanical action such as a spring during power-off. Moreover, the internal brakes and the external brakes may be a brake other than the non-excitation operation type electromagnetic brake.

In the first joint 23, the rotation of the motor 41a is decelerated and output by the speed reducer 42a to rotate the first lifting arm 24, and thus the posture of the first lifting arm 24 to the support 21 is changed. Moreover, in the first joint 23, because the internal brake 43a and the external brake 44a are activated at the time of power-on and power-off, the posture of the first lifting arm 24 to the support 21 is maintained.

In the second joint 25, the rotation of the motor 41b is decelerated and output by the speed reducer 42b to rotate the second lifting arm 26, and thus the posture of the second lifting arm 26 to the first lifting arm 24 is changed. Moreover, in the second joint 25, because the internal brake 43b and the external brake 44b are activated at the time of power-on and power-off, the posture of the second lifting arm 26 to the first lifting arm 24 is maintained.

In the third joint 27, the rotation of the motor 41c is decelerated and output by the speed reducer 42c to rotate the horizontal arm unit 30, and thus the posture of the horizontal arm unit 30 to the second lifting arm 26 is changed. Moreover, in the third joint 27, because the internal brake 43c and the external brake 44c are activated at the time of power-on and power-off, the posture of the horizontal arm unit 30 to the second lifting arm 26 is maintained.

Figure 3:
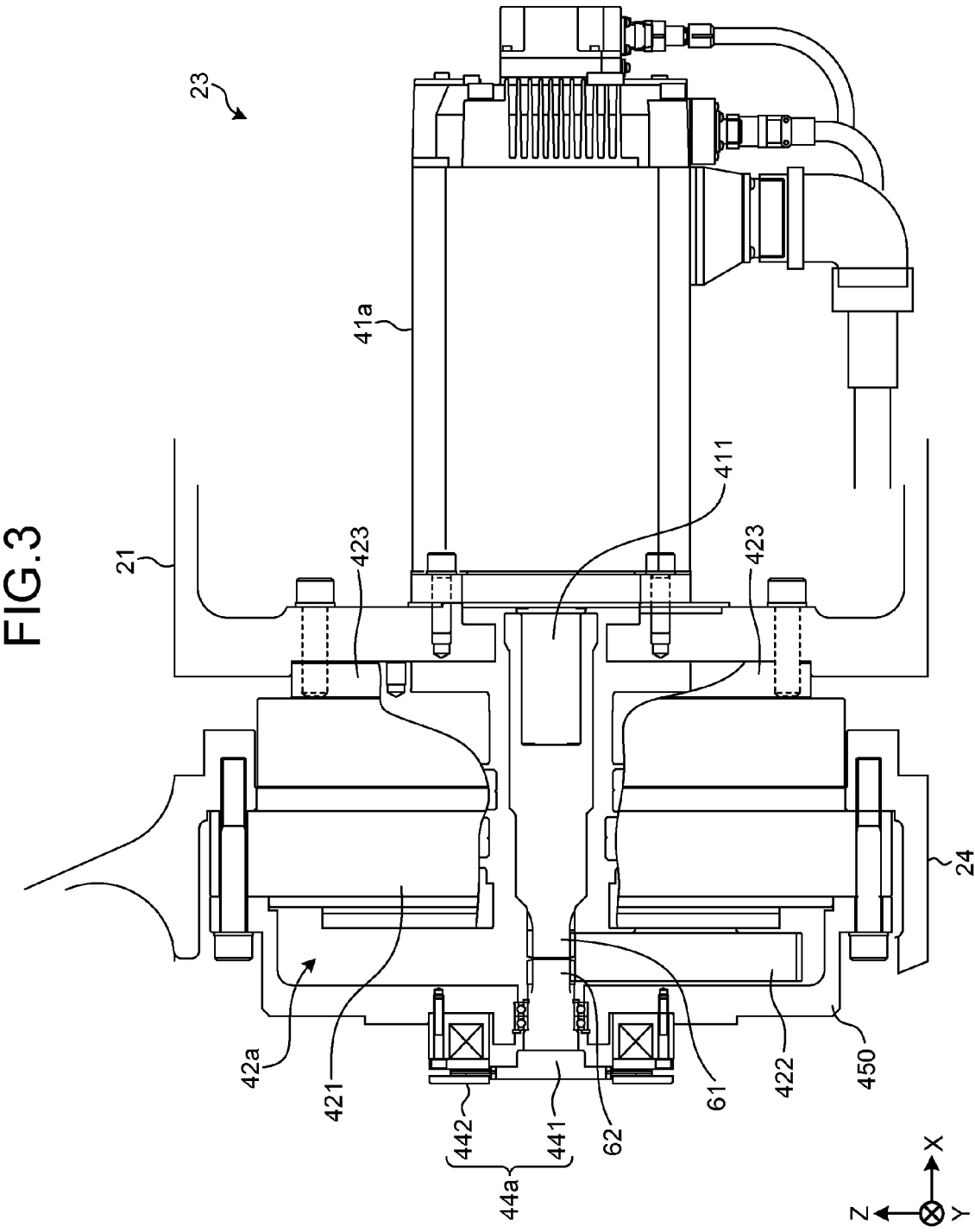
FIG. 3 is a partial perspective diagram illustrating the vicinity of a first joint.

Next, the specific configuration of the motors 41a to 41c, the speed reducers 42a to 42c, and the external brakes 44a to 44c will be explained. Herein, the configuration of the motor 41a, the speed reducer 42a, and the external brake 44a provided in the first joint 23 is explained as an example with reference to FIG. 3. FIG. 3 is a partial perspective diagram illustrating the vicinity of the first joint 23.

In the first joint 23, the motor 41a is fixed to the support 21 and the speed reducer 42a is fixed to the first lifting arm 24 as illustrated in FIG. 3. Moreover, the external brake 44a is placed opposite the motor 41a via the speed reducer 42a and is fixed to a speed reducer main body 421 of the speed reducer 42a via a casing 450.

The speed reducer 42a is, for example, an RV (Rotary Vector) type speed reducer and includes the speed reducer main body 421, an input unit 422, and an output unit 423. The speed reducer 42a reduces the rotation input into the input unit 422 and outputs it to the output unit 423.

More specifically, a first shaft 61 is connected to the input unit 422. Moreover, the first shaft 61 is connected to an output shaft 411 of the motor 41a. As a result, the turning force of the motor 41a is input into the input unit 422 of the speed reducer 42a via the output shaft 411 of the motor 41a and the first shaft 61. Then, when the turning force of the motor 41a is input into the input unit 422, the speed reducer 42a rotates the output unit 423 at a rotational speed slower than that of the motor 41a.

The output unit 423 of the speed reducer 42a is fixed to the support 21. For this reason, when the rotation of the motor 41a is input into the input unit 422, the speed reducer main body 421 is rotated instead of the output unit 423 in the first joint 23. As a result, the first lifting arm 24 for fixing thereto the speed reducer main body 421 is rotated in the first joint 23 and thus the posture of the first lifting arm 24 to the support 21 is changed.

The speed reducer 42a is not limited to a RV-type speed reducer. Therefore, the speed reducer 42a may be another type speed reducer.

A second shaft 62 is further connected to the input unit 422 of the speed reducer 42a. In the second shaft 62, its bottom end is provided near the leading end of the first shaft 61 and its central axis is the same as the central axis of the first shaft 61.

In other words, in the first embodiment, a shaft connected to the input unit 422 of the speed reducer 42a is divided into two shafts.

The external brake 44a includes a brake shaft 441 and a brake main body 442. The brake shaft 441 is coupled with the leading end of the second shaft 62 and its central axis is the same as the central axis of the second shaft 62.

The brake main body 442 includes, for example, a field core, a coil, a side plate, an armature, a spring, a brake plate, and the like. The field core is a tubular member that is formed of a soft magnetic material. The coil is provided inside the field core. The side plate is fixed to the field core via a volt or the like. The armature is provided between the field core and the side plate. The spring biases the armature in an axial direction. The brake plate is provided between the armature and the side plate to rotate along with the rotation of the brake shaft 441.

The brake main body 442 includes, for example, a tubular field core formed of a soft magnetic material, a coil provided inside the field core, and a side plate fixed to the field core via a bolt or the like. Moreover, the brake main body 442 includes an armature provided between the field core and the side plate, a spring for biasing the armature in an axial direction, and a brake plate that is provided between the armature and the side plate to rotate along with the rotation of the brake shaft 441.

When electric currents are applied to the coil, the external brake 44a has an excited state and the armature is magnetically attracted to the field core against an elastic force of the spring. As a result, a pressing force against the brake plate is opened and thus the brake shaft 441 and the second shaft 62 have a rotatable state.

On the other hand, when a driving power source is blocked to be a non-excited state in the external brake 44a, its armature is pressed toward the side plate by the elastic force of the spring. As a result, the rotation of the brake plate is regulated by a frictional force between the armature and the side plate, and thus the rotation of the brake shaft 441 and the second shaft 62 is regulated.

In the speed reducer 42a, when the rotation of the second shaft 62 is regulated by the external brake 44a, the rotation of the input unit 422 connected to the second shaft 62 is regulated and the rotation of the output unit 423 is regulated. As a result, in the robot 1, the posture of the first lifting arm 24 to the support 21 is maintained.

In this way, two shafts of the first shaft 61 and the second shaft 62 are connected to the input unit 422 of the speed reducer 42a.

Figure 4:
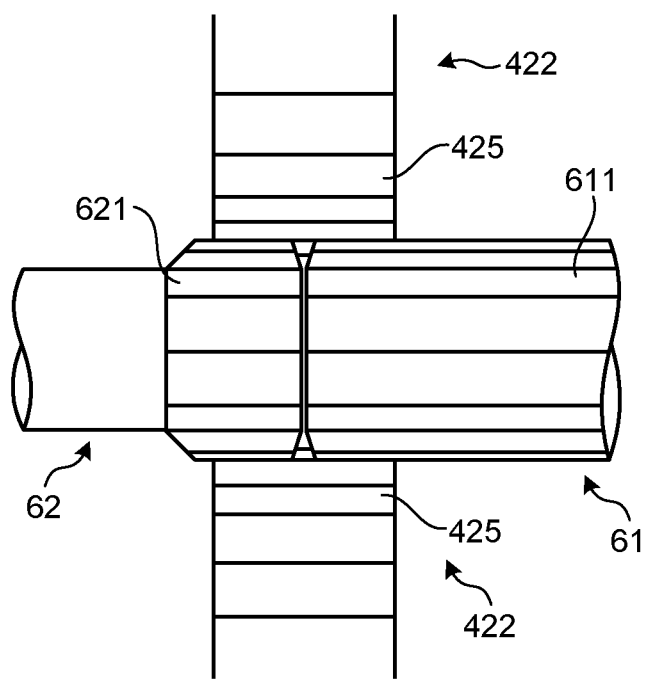
FIG. 4 is an enlarged view illustrating the vicinity of an input unit.

Hereinafter, the configuration of the first shaft 61, the second shaft 62, and the input unit 422 is explained more specifically with reference to FIG. 4. FIG. 4 is an enlarged view illustrating the vicinity of the input unit 422.

As illustrated in FIG. 4, the input unit 422 is, for example, a spur gear and includes a first toothed gear 425. The first shaft 61 and the second shaft 62 respectively include input gears 611 and 621. The input gears 611 and 621 respectively are examples of a second toothed gear and a third toothed gear.

The input gear 611 and the input gear 621 are engaged with the first toothed gear 425 of the input unit 422. In the speed reducer 42a, the first toothed gear 425 is engaged with the input gear 611 and thus the rotation of the motor 41a is input into the input unit 422 via the input gear 611 and the first toothed gear 425. As a result, in the speed reducer 42a, the input unit 422 rotates and thus the output unit 423 rotates along with the rotation of the input unit 422.

In the speed reducer 42a, the first toothed gear 425 is engaged with the input gear 621 and thus the braking force of the external brake 44a is introduced into the input unit 422 via the input gear 621 and the first toothed gear 425. As a result, the rotation of the input unit 422 is regulated in the speed reducer 42a.

Herein, the robot 1 frequently performs operations for swiveling the first lifting arm 24 from the stopped state and for stopping the first lifting arm 24 during swiveling. For this reason, the input gear 611 is easily subjected to a comparatively large load.

On the other hand, because the input gear 621 only rotates along with the rotation of the first toothed gear 425 in the state where the external brake 44a does not operate, there is a low possibility that the input gear 621 is subjected to a load larger than the input gear 611. Moreover, because the external brake 44a generally operates in a state where the first lifting arm 24 is stopped or in a state where a speed is reduced, there is a low possibility that the input gear 621 is subjected to a load larger than the input gear 611 even if the external brake 44a is activated.

In this way, because the input gear 611 is easily subjected to a large load compared to the input gear 621, the input gear 611 easily degrades earlier than the input gear 621. The input gear 611 is degraded, and thus a backlash can occur between the input gear 611 and the first toothed gear 425.

Herein, it is assumed that the first shaft 61 and the second shaft 62 are one shaft that is integrally formed and the input gear 611 and the input gear 621 are one input gear that is integrally formed. In other words, it is assumed that the turning force of the motor 41a and the braking force of the external brake 44a are transmitted to the first lifting arm 24 via one input gear.

In this case, when a backlash occurs between the input gear and the first toothed gear 425, there is a possibility that the braking force of the external brake 44a is not transmitted to the first lifting arm 24 even if the external brake 44a is actuated and thus the posture of the first lifting arm 24 is maintained in a state where its position is deviated by the backlash amount.

However, in the robot 1 according to the first embodiment, the input gear 621 that transmits the braking force of the external brake 44a is provided separately from the input gear 611 that transmits the turning force of the motor 41a. For this reason, the braking force of the external brake 44a is appropriately transmitted to the first lifting arm 24 via the input gear 621 even if a backlash occurs between the input gear 611 and the first toothed gear 425. Therefore, according to the robot 1 according to the first embodiment, the position deviation of a component such as the first lifting arm 24 can be prevented.

As described above, it has been explained in the first embodiment that the first shaft and the second shaft are connected to the input unit of the speed reducer, the motor rotates the first shaft, and the external brake regulates the rotation of the second shaft. Therefore, in the first embodiment, the position deviation of a component such as an arm can be prevented.

The motor 41a includes the internal brake 43a built-in (see FIG. 2). The internal brake 43a regulates the rotation of the output shaft 411 of the motor 41a in a non-excited state. In other words, the robot 1 can hold the posture of the first lifting arm 24 to the support 21 by activating the internal brake 43a, similarly to the case where the external brake 44a is activated.

In this way, it has been assumed that the robot 1 provides two brakes of the internal brake 43a and the external brake 44a for the one motor 41a. For this reason, a braking force can be raised in comparison to when the rotation of the motor 41a is regulated by only the internal brake 43a.

Moreover, because an arm can be held by activating the external brake 44a even if a braking torque of the internal brake 43a decreases from any cause and thus only the internal brake 43a cannot hold the arm, the free fall of the arm is prevented and thus security can be raised. Similarly, because a posture holding torque can be transmitted by the input gear 621 even if the input gear 611 is worn out not to engage with another gear, there is not a possibility that an arm free-falls.

Herein, it has been explained that the first shaft 61 is separated from the output shaft 411 of the motor 41a. However, the first shaft 61 and the output shaft 411 of the motor 41a may be integrally formed previously. Similarly, it has been explained that the second shaft 62 is separated from the brake shaft 441 of the external brake 44a. However, the second shaft 62 and the brake shaft 441 of the external brake 44a may be integrally formed previously.

Meanwhile, the case where a length by which the input gear 611 comes into contact with the first toothed gear 425 and a length by which the input gear 621 comes into contact with the first toothed gear 425 in the axial direction of the first toothed gear 425 are the same is illustrated in FIG. 4. However, lengths by the input gears 611 and 621 come into contact with the first toothed gear 425 may be different.

Figure 5A:
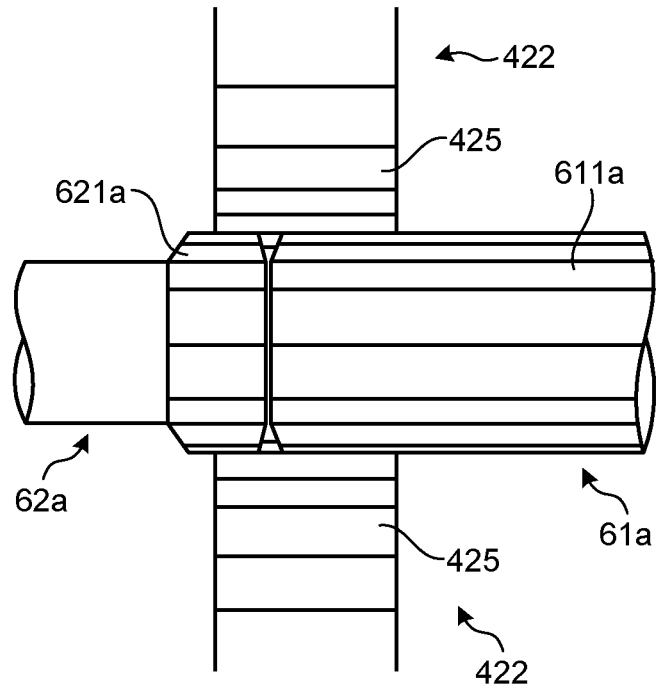
FIGS. 5A and 5B are enlarged views illustrating another configuration example of the input unit, a first shaft, and a second shaft.

Hereinafter, the case where the lengths by which the input gears 611 and 621 come into contact with the first toothed gear 425 are different is explained with reference to FIG. 5A. FIG. 5A is an enlarged view illustrating another configuration example of the input unit 422, the first shaft 61, and the second shaft 62.

As illustrated in FIG. 5A, a length by which an input gear 611a of a first shaft 61a comes into contact with the first toothed gear 425 is longer than a length by which an input gear 621a of a second shaft 62a comes into contact with the first toothed gear 425. More specifically, the first shaft 61a is formed longer than the first shaft 61 illustrated in FIG. 4.

Moreover, the second shaft 62a is formed shorter than the second shaft 62 illustrated in FIG. 4.

As described above, the input gear 611a of the first shaft 61a tends to be easily subjected to a load compared to the input gear 621a of the second shaft 62a. Therefore, the durability of the input gear 611a can be raised by increasing the length by which the input gear 611a comes into contact with the first toothed gear 425 compared to the case illustrated in FIG. 4. As a result, the occurrence of the backlash of the input gear 611a can be suppressed.

The case where the length by which the input gear 611a comes into contact with the first toothed gear 425 is longer than the length by which the input gear 621a comes into contact with the first toothed gear 425 is illustrated in FIG. 5A. However, the length by which the input gear 621a comes into contact with the first toothed gear 425 may be longer than the length by which the input gear 611a comes into contact with the first toothed gear 425. In this case, the durability of the input gear 621a can be raised and thus the occurrence of the backlash of the input gear 621a can be suppressed.

Figure 5B:
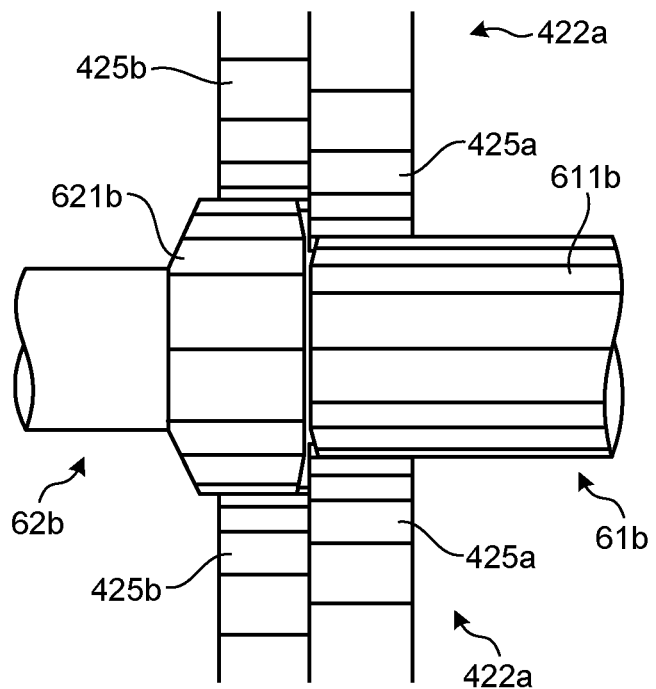

It has been assumed in FIG. 4 that the number of teeth of the input gear 611 included in the first shaft 61 is the same as the number of teeth of the input gear 621 included in the second shaft 62. However, the number of teeth of the input gear 611 may be different from the number of teeth of the input gear 621. Hereinafter, the case where the number of teeth of the input gear 611 is different from the number of teeth of the input gear 621 is explained with reference to FIG. 5B. FIG. 5B is an enlarged view illustrating another configuration example of the input unit 422, the first shaft 61, and the second shaft 62.

As illustrated in FIG. 5B, the number of teeth of an input gear 621b included in a second shaft 62b is more than the number of teeth of an input gear 611b included in a first shaft 61b.

The first shaft 61b includes the input gear 611b that is similar to the input gear 611 illustrated in FIG. 4. On the other hand, the second shaft 62b includes the input gear 621b that has a larger diameter than that of the input gear 611b. The number of teeth of the input gear 621b is more than that of the input gear 611b.

An input unit 422a has, for example, a two-step gear mechanism. More specifically, the input unit 422a includes a large-diameter toothed gear 425a and a small-diameter toothed gear 425b as the first toothed gear. The large-diameter toothed gear 425a is engaged with the input gear 611b. The small-diameter toothed gear 425b is engaged with the input gear 621b.

In this way, it has been explained in FIG. 5B that the number of teeth of the input gear 621b included in the second shaft 62b is more than the number of teeth of the input gear 611b included in the first shaft 61b. More specifically, the diameter of the input gear 621b is larger than that of the input gear 611b. As a result, the backlash of the input gear 621b can be suppressed.

It has been explained in FIG. 5B that the number of teeth of the input gear 621b is more than that of the input gear 611b. Conversely, the number of teeth of the input gear 611b may be more than that of the input gear 621b. In this case, the backlash of the input gear 611b can be suppressed. Moreover, it has been assumed in FIG. 5B that the length by which the input gear 611b comes into contact with the large-diameter toothed gear 425a is the same as the length by which the input gear 621b comes into contact with the small-diameter toothed gear 425b. However, the lengths by which the input gears 611b and 621b come into contact with the respective toothed gears may be different as illustrated in FIG. 5A.

Second Embodiment

Next, an operation control of the robot 1 performed by the control device 5 will be explained as the second embodiment. The control device 5 performs a diagnostic process for diagnosing whether a backlash occurs between the input gear 611 of the first shaft 61 and the first toothed gear 425, in addition to the drive control of the motors 41a to 41c.

Moreover, a high-order controller that receives abnormality from the control device 5 can secure security by performing an abnormality correspondence treatment. Moreover, the degradation of an amount of production during abnormality can be minimized by incorporating a program for switching the present production method into a sub-line production method in order to avoid the stop of the production line.

Figure 6:
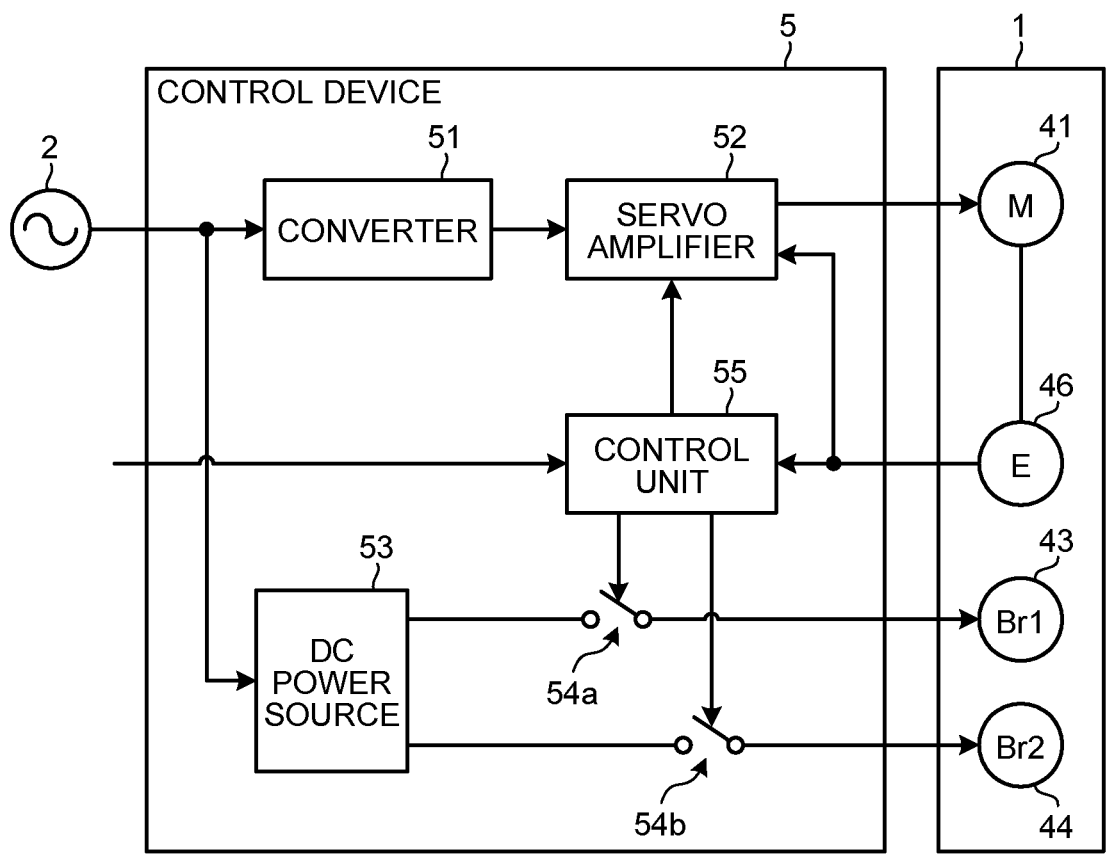
FIG. 6 is a block diagram illustrating a configuration example of a control device according to a second embodiment.

First, the configuration of the control device 5 is explained with reference to FIG. 6. FIG. 6 is a block diagram illustrating a configuration example of the control device 5. Moreover, only components needed to explain the characteristic of the control device 5 is illustrated in FIG. 6 and the description on general components is omitted.

Hereinafter, any external brake of the external brakes 44a to 44c can be referred to as an "external brake 44". Similarly, any internal brake of the internal brakes 43a to 43c can be referred to as an "internal brake 43". Moreover, in FIG. 6, the internal brake 43 is described as "Br1" and the external brake 44 is described as "Br2".

As illustrated in FIG. 6, the control device 5 includes a converter 51, a servo amplifier 52, a DC power source 53, switches 54a and 54b, and a control unit 55.

As illustrated in FIG. 6, the robot 1 further includes an encoder 46. The encoder 46 is an example of a detecting unit that detects a rotation position of a motor 41 and is provided in correspondence with the motor 41. The rotation position (hereinafter, "encoder value") of the motor 41 detected by the encoder 46 is output to the control unit 55.

Herein, it is assumed that the encoder 46 is an absolute-value encoder. However, the embodiment is not limited to this. Therefore, the encoder 46 may be an incremental encoder. Moreover, a resolver may be used as a position detecting unit in place of the encoder 46.

The converter 51 is a device that generates a driving power of the motor 41 by using AC power supplied from an AC (Alternating Current) main power source 2. The driving power generated by the converter 51 is input into the servo amplifier 52. The servo amplifier 52 is a processing unit that performs a PWM control in accordance with the command of the control unit 55 and supplies the driving power to the motor 41.

The DC power source 53 generates DC power from the AC power supplied from the AC main power source 2. The DC power generated by the DC power source 53 is supplied to the internal brake 43 and the external brake 44. Moreover, although it is not illustrated, the DC power generated by the DC power source 53 is also supplied to the control unit 55.

The switch 54a is a power switch of the internal brake 43 and switches the supply and cutoff of the DC power of the DC power source 53 to and from the internal brake 43. Moreover, the switch 54b is a power switch of the external brake 44 and switches the supply and cutoff of the DC power of the DC power source 53 to and from the external brake 44.

The switching of the switches 54a and 54b is performed by the control unit 55. Moreover, the internal brake 43 and the external brake 44 are activated by turning off the switches 54a and 54b, that is to say, by blocking power transmission to regulate the rotation of the motor 41.

The control unit 55 performs arithmetic processing required for the control of the motor 41 on the basis of command data of an operation unit such as a pendant or a high-order controller such as PC (Personal Computer) and the encoder value acquired from the encoder 46, and generates a PWM waveform to outputs it to the servo amplifier 52. Moreover, the PWM control is performed in the servo amplifier 52 in accordance with the PWM waveform.

The control unit 55 performs the diagnostic process on the basis of the command of the operation unit or the high-order controller. Herein, the diagnostic process is a process for diagnosing whether a backlash occurs between the input gear 611 of the first shaft 61 and the first toothed gear 425.

Figure 7:
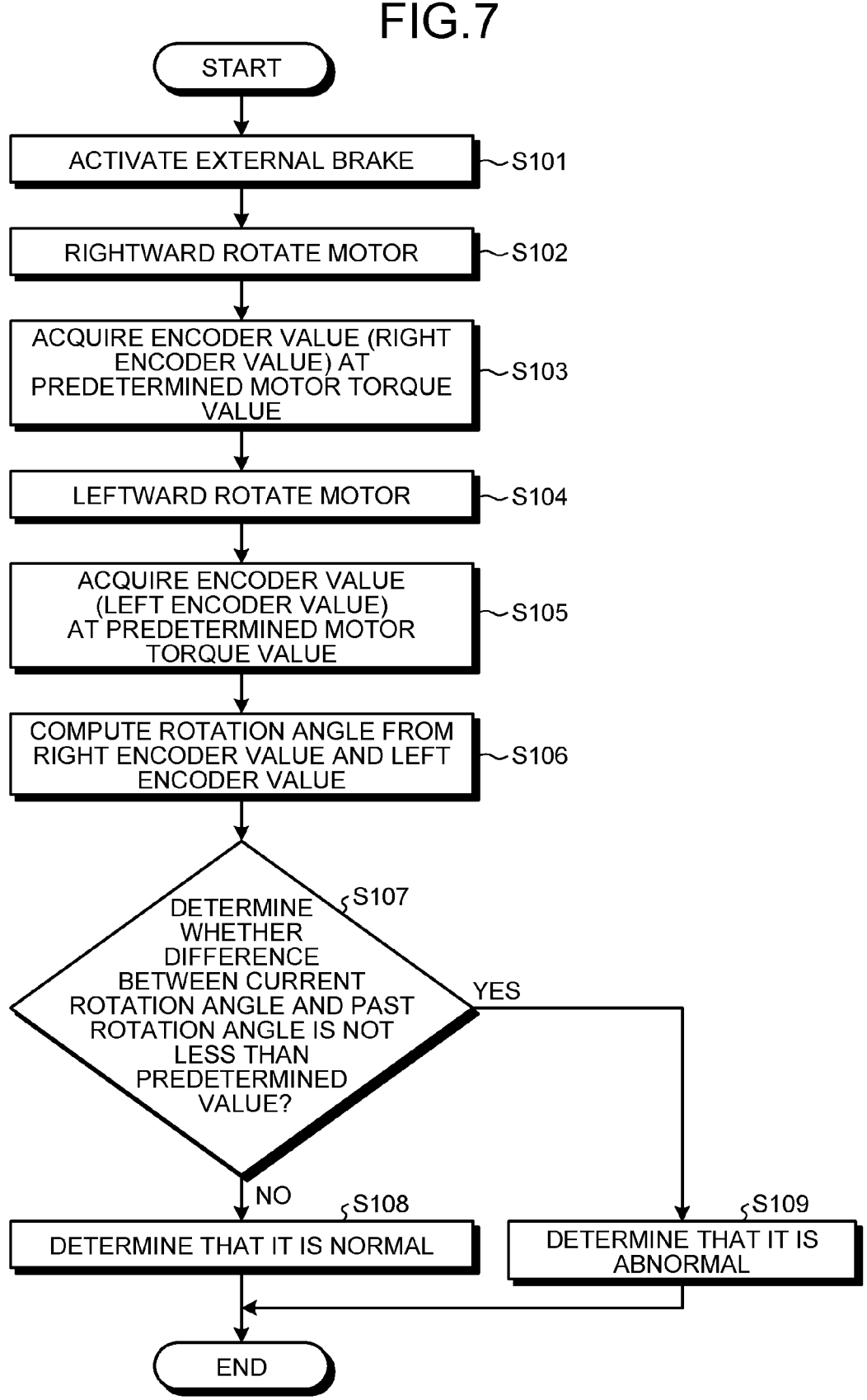
FIG. 7 is a flowchart illustrating an example of a routine of a diagnostic process.

Now, the specific routine of the diagnostic process is explained with reference to FIG. 7. FIG. 7 is a flowchart illustrating an example of the routine of the diagnostic process. The diagnostic process is started in the state where the switches 54a and 54b are turned on together, that is to say, in the state where the internal brake 43 and the external brake 44 are released together. Moreover, the diagnostic process may be started in the case when the control device 5 receives the command from the operation unit or the high-order controller or may be regularly started with the previously determined period.

As illustrated in FIG. 7, when the diagnostic process is started, the control unit 55 of the control device 5 activates the external brake 44 (Step S101). Next, the control unit 55 rightward rotates the motor 41 (Step S102) and acquires an encoder value at a predetermined motor torque value (Step S103). Herein, the encoder value acquired at Step S103 is referred to as a "right encoder value".

Next, the control unit 55 leftward rotates the motor 41 (Step S104) and acquires an encoder value at a predetermined motor torque value (Step S105). Herein, the encoder value acquired at Step S105 is referred to as a "left encoder value".

Next, the control unit 55 computes a rotation angle of the motor 41 on the basis of the right encoder value acquired at Step S103 and the left encoder value acquired at Step S105 (Step S106). More specifically, the control unit 55 computes a difference between the right encoder value and the left encoder value and converts the computed difference into a rotation angle. The control unit 55 stores the computed rotation angle in a storage unit (not illustrated) such as RAM (Random Access Memory).

Next, the control unit 55 determines whether a difference between the rotation angle (current backlash amount) computed at Step S106 and the rotation angle (reference backlash amount) computed in past times is not less than a predetermined value (Step S107).

Then, when the difference between the current rotation angle and the rotation angle computed in past times is less than the predetermined value (Step S107: No), the control unit 55 determines that the input gear 611 of the first shaft 61 and the first toothed gear 425 are normal (Step S108) and terminates the process. In other words, when there is not a significant change between the current backlash amount and the reference backlash amount, the control unit 55 determines that a backlash does not occur between the input gear 611 of the first shaft 61 and the first toothed gear 425.

On the other hand, when it is determined that the difference between the current rotation angle and the rotation angle computed in past times is not less than the predetermined value (Step S107: Yes), the control unit 55 determines that the input gear 611 of the first shaft 61 or the first toothed gear 425 is not normal (Step S109) and terminates the process. In other words, when the current backlash amount is largely changed as compared to the reference backlash amount, the control unit 55 determines that a backlash occurs between the input gear 611 of the first shaft 61 and the first toothed gear 425.

When abnormality is determined at Step S109, the control unit 55 may drive the motor 41 to make the robot 1 take a withdrawal posture. The withdrawal posture is a posture in which the arms (the first lifting arm 24 and the second lifting arm 26) of the robot 1 are let down up to the lowest position. In this way, assuming that the robot 1 takes the withdrawal posture, security against the position deviation can be secured even if there is a high possibility that the position of the arm of the robot 1 is deviated die to its own weight.

The control unit 55 may perform a process for making the robot 1 take the withdrawal posture and then blocking power transmission to the motor 41. As a result, the security against the position deviation of an arm of the robot 1 can be further raised.

As described above, it has been explained in the second embodiment that the robot 1 further includes the encoder 46 that detects the rotation of the first shaft 61. Moreover, it has been explained in the second embodiment that the control device 5 detects the abnormality of the first shaft 61 or the input unit 422 on the basis of the detection result of the encoder 46 when the motor 41 is driven in the state where the external brake 44 is activated. Therefore, it can be easily diagnosed whether a backlash occurs between the input gear 611 of the first shaft 61 and the first toothed gear 425, for example.

It has been explained in FIG. 7 that the motor 41 is rightward rotated and the right encoder value is acquired, and then the motor 41 is leftward rotated and the left encoder value is acquired (see Step S102 to Step S105). However, the rotation direction of the motor 41 may be reverse. In other words, the control unit 55 may leftward rotate the motor 41 and acquire a left encoder value, and then rightward rotate the motor 41 and acquire a right encoder value.

Meanwhile, it has been explained in the embodiments described above that the robot supports a horizontal arm unit by using one leg unit. However, the type of the robot is not limited to this.

Third Embodiment

Figure 8:
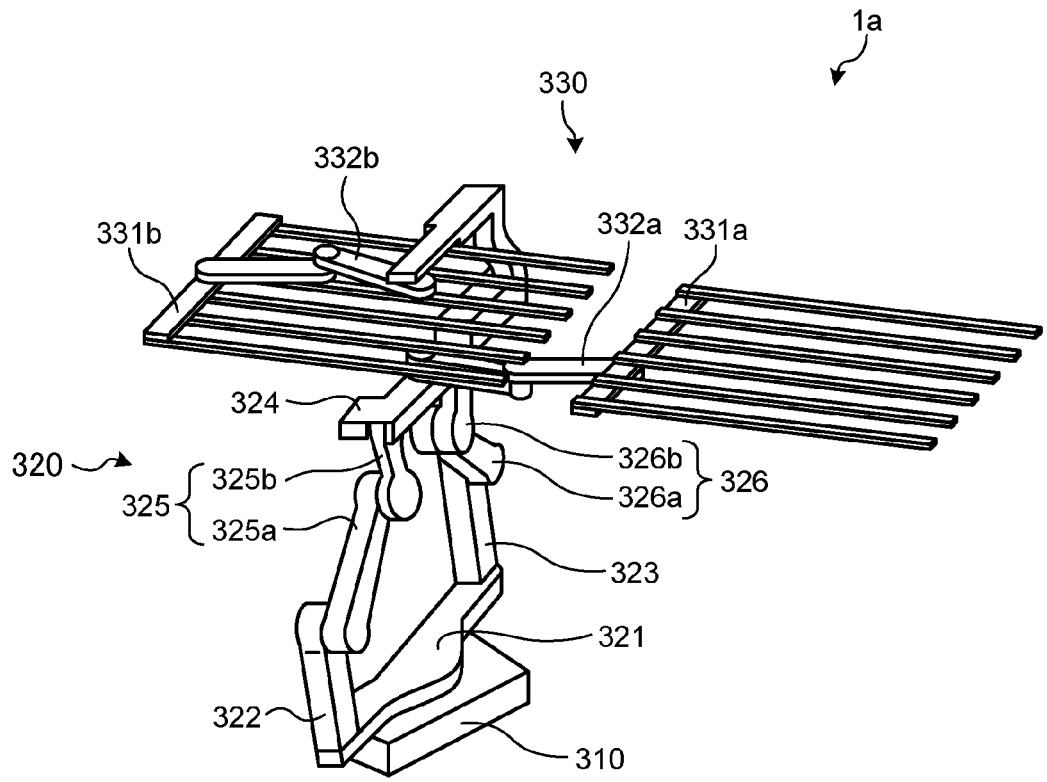
FIG. 8 is a pattern perspective view of a robot according to a third embodiment.

For example, the robot may support a horizontal arm unit by using two or more leg units. Therefore, another example of the robot is below explained with reference to FIG. 8 as the third embodiment. FIG. 8 is a pattern perspective view of a robot 1a according to the third embodiment.

As illustrated in FIG. 8, the robot 1a according to the third embodiment includes a base 310, a lifting and lowering mechanism 320, and a horizontal arm unit 330. The lifting and lowering mechanism 320 includes a swiveling unit 321 that is rotatably attached to the base 310, supporting units 322 and 323 that are respectively provided at both ends of the swiveling unit 321 in a standing manner, and a supporting base 324 that rotatably supports the horizontal arm unit 330. Moreover, the lifting and lowering mechanism 320 includes two leg units 325 and 326 of which the bottom ends are respectively supported on the supporting units 322 and 323 and the leading ends support the supporting base 324.

The leg unit 325 includes a first leg 325a of which the bottom end is rotatably supported on the supporting unit 322 and a second leg 325b of which the bottom end is rotatably supported on the leading end of the first leg 325a and the leading end supports the supporting base 324. Similarly, the leg unit 326 includes a first leg 326a of which the bottom end is rotatably supported on the supporting unit 323 and a second leg 326b of which the bottom end is rotatably supported on the leading end of the first leg 326a and the leading end supports the supporting base 324.

The horizontal arm unit 330 includes hand parts 331a and 331b that place thereon the workpiece W and arm parts 332a and 332b that support the hand parts 331a and 331b on their leading ends. Similarly to the horizontal arm unit 30 according to the first embodiment, the horizontal arm unit 330 moves the hand parts 331a and 331b in a predetermined direction in accordance with the expansion and contraction of the arm parts 332a and 332b.

The lifting and lowering mechanism 320 changes the postures of the two leg units 325 and 326 to move the horizontal arm unit 330 in up and down directions. Moreover, because the lifting and lowering mechanism 320 supports the horizontal arm unit 330 by using the two leg units 325 and 326, the lifting and lowering mechanism 320 can more surely hold the horizontal arm unit 330 as compared to the lifting and lowering mechanism 20 according to the first embodiment.

Each of joints of the lifting and lowering mechanism 320 is provided with a motor that has an internal brake built-in, a speed reducer, and an external brake. The configuration of the motor, the speed reducer, and the external brake is the same as that of the motor, the speed reducer, and the external brake described in the embodiments described above.

In this way, the robot may support the horizontal arm unit by using the two leg units. In this case, the same effect as that of the first and second embodiments described above can be obtained. Moreover, the robot that includes two leg units is illustrated in FIG. 8. However, the number of leg units may be two or more.

Fourth Embodiment

Figure 9:
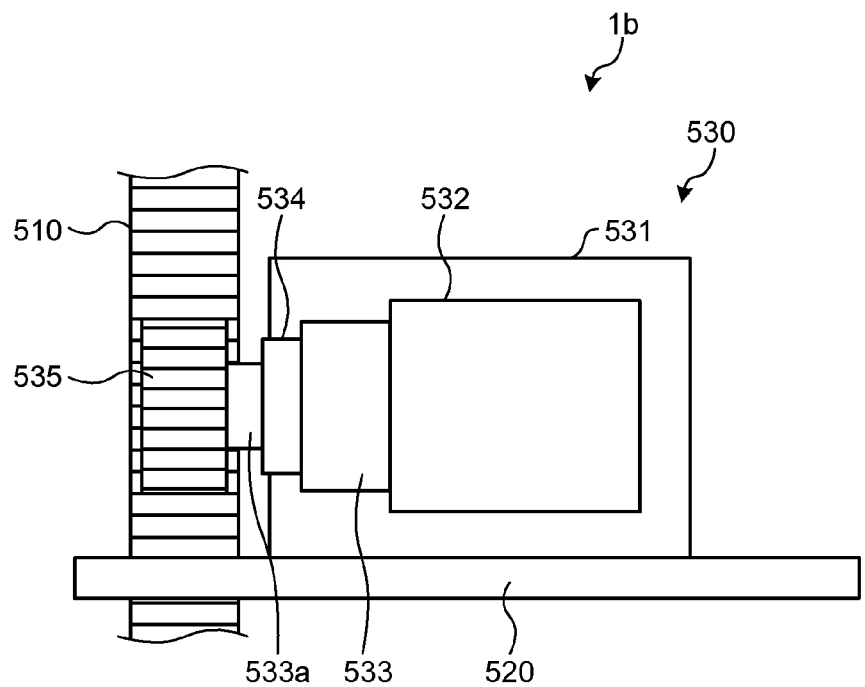
FIG. 9 is a diagram obtained by expanding a part of a robot according to a fourth embodiment.

The robot may be, for example, a direct acting conveyor robot. Therefore, the case where a robot is a direct acting conveyor robot is below explained with reference to FIG. 9 as the fourth embodiment. FIG. 9 is a diagram obtained by expanding a part of a robot 1b according to the fourth embodiment.

As illustrated in FIG. 9, the robot 1b according to the fourth embodiment is a rack-and-pinion robot that converts a turning force into a linear movement to perform a movement in up and down directions. More specifically, the robot 1b includes a rack unit 510 that extends in up and down directions, a linear motion body 520 that is movably held in up and down directions with respect to the rack unit 510, and a motor unit 530 that is mounted on the linear motion body 520.

The motor unit 530 includes a supporting part 531 that is provided on the linear motion body 520 in a standing manner, a motor 532 that is fixed to the supporting part 531, and a speed reducer 533 that reduces and outputs the rotation of the motor 532. The motor unit 530 further includes an external brake 534 that regulates the rotation of the motor 532 and a pinion gear 535 that is attached to the leading end of an output shaft 533a of the speed reducer 533. Moreover, the motor 532 has an internal brake built-in, similarly to the motor according to the embodiments described above.

The robot 1b rotates the pinion gear 535 by the drive of the motor 532 in the state where the pinion gear 535 is engaged with the rack unit 510 and thus moves the linear motion body 520 in up and down directions.

In this way, the robot may be a direct acting robot as illustrated in FIG. 9. In this case, the same effect as that of the first and second embodiments described above can be obtained.

It has been explained in the embodiments that the second shaft and the input unit of the speed reducer are engaged to be interconnected by a toothed gear. However, the second shaft and the input unit of the speed reducer may be connected by using a connection method other than the toothed gear. Moreover, the second shaft and the input unit of the speed reducer may be integrally formed previously.

It has been explained in the embodiments described above that the motor includes the internal brake. However, the motor may not necessarily include the internal brake.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot comprising:
    a speed reducer that reduces and outputs rotation to be input into an input unit;
    a first shaft that is connected to the input unit;
    a rotary electric machine that rotates the first shaft;
    a second shaft that is placed on a same shaft line as that of the first shaft and is connected to the input unit; and
    a brake that regulates rotation of the second shaft, wherein
    the speed reducer includes a first toothed gear that acts as the input unit,
    the first shaft includes a second toothed gear that is engaged with the first toothed gear, and
    the second shaft includes a third toothed gear that is engaged with the first toothed gear.

2. The robot according to claim 1, wherein a length by which the second toothed gear comes into contact with the first toothed gear in an axial direction of the first toothed gear is different from a lengths by which the third toothed gear comes into contact with the first toothed gear in the axial direction of the first toothed gear.

3. The robot according to claim 2, wherein the number of teeth of the second toothed gear is different from the number of teeth of the third toothed gear.

4. The robot according to claim 1, wherein the number of teeth of the second toothed gear is different from the number of teeth of the third toothed gear.

5. A robot system comprising:
    a robot; and
    a control device that controls the robot, and
    the robot including:
        a speed reducer that reduces and outputs rotation to be input into an input unit;
        a first shaft that is connected to the input unit;
        a rotary electric machine that rotates the first shaft;
        a second shaft that is placed on a same shaft line as that of the first shaft and is connected to the input unit; and
        a brake that regulates rotation of the second shaft, wherein
    the speed reducer includes a first toothed gear that acts as the input unit,
    the first shaft includes a second toothed gear that is engaged with the first toothed gear, and
    the second shaft includes a third toothed gear that is engaged with the first toothed gear.

6. The robot system according to claim 5, wherein
    the robot further includes a detecting unit that detects rotation of the first shaft, and
    the control device detects abnormality of the first shaft or the input unit on the basis of a detection result of the detecting unit when the rotary electric machine is driven in a state where the brake is activated.

7. A robot comprising:
a speed reducing means for reducing and outputting rotation to be input into an input unit;
a first shaft that is connected to the input unit;
a rotating means for rotating the first shaft;
a second shaft that is placed on a same shaft line as that of the first shaft and is connected to the input unit; and
a regulating means for regulating rotation of the second shaft, wherein
the speed reducing means includes a first toothed gear that acts as the input unit,
the first shaft includes a second toothed gear that is engaged with the first toothed gear, and
the second shaft includes a third toothed gear that is engaged with the first toothed gear.

8. A robot system comprising:
a robot; and
a control device that controls the robot, and
the robot including:
    a speed reducer that reduces and outputs rotation to be input into an input unit;
    a first shaft that is connected to the input unit;
    a rotary electric machine that rotates the first shaft;
    a second shaft that is connected to the input unit; and
    a brake that regulates rotation of the second shaft, wherein the robot further includes a detecting unit that detects rotation of the first shaft, and
the control device detects abnormality of the first shaft or the input unit on the basis of a detection result of the detecting unit when the rotary electric machine is driven in a state where the brake is activated.

* * * * *